United States Patent Office 3,506,741
Patented Apr. 14, 1970

3,506,741
HALOGENATED POLYMERS AND BLOCK COPOLYMERS PRODUCED THEREFROM
William J. Trepka and Carl A. Urancek, Bartlesville, Okla., assignors to Phillips Petroleum Company, a corporation of Delaware
No Drawing. Filed Jan. 10, 1966, Ser. No. 519,473
Int. Cl. C08d 5/04, 9/08, 9/16
U.S. Cl. 260—889
9 Claims

ABSTRACT OF THE DISCLOSURE

Hydrocarbon polymers having at least one hydrogen attached to a tertiary carbon atom per molecule are halogenated by contacting said polymer with a tertiary alkyl halide and an aluminum halide; and the halogenated polymer is recovered.

---

This invention relates to polymer products. In one aspect this invention relates to the introduction of halogen atoms into polymer molecules. In another aspect this invention relates to a method for making block copolymers from halogenated polymers.

Several methods for introducing halogen atoms into polymer molecules are known in the prior art. However, it is difficult to control the extent of halogenation of polymer molecules using the prior art methods. When polymers are halogenated by the prior art methods, the halogen atoms are usually incorporated into the polymer molecule in random amounts. It is also known to react the halogenated polymers made by prior art methods with lithium terminated polymers to produce branched copolymers. Since the halogen atoms are disposed in varying amounts throughout the polymer molecules, the resulting branched copolymers will have a variable number of branches.

It is an object of our invention to provide a method for halogenating polymers. It is another object of our invention to provide a method for halogenating polymers wherein the halogen is introduced into the polymer molecule in controlled amounts. It is a further object of our invention to provide a method for making block copolymers by reacting lithium terminated polymers with halogenated polymers wherein the halogen content is closely controlled.

Various other aspects, objects and advantages of our invention will be apparent to those skilled in the art upon studying the accompanying disclosure and appended claims.

We have discovered that certain polymers can be halogenated to produce polymers having an average of one halogen atom per molecule. This controlled halogenation of polymers is broadly accomplished by contacting a polymer in which there is at least one hydrogen atom attached to a tertiary carbon atom per polymer molecule with a tertiary alkyl halide and an aluminum halide. After the above-mentioned reactants have been contacted for a suitable length of time, a polymer can be recovered that has an average of one halogen atom per molecule. This halogenated polymer can then be further reacted with a lithium terminated polymer to produce a block copolymer.

In order for the desired halogenation to take place according to our invention, it is necessary that the polymer molecule have at least one hydrogen atom that is attached to a tertiary carbon atom. Suitable polymers are atactic polypropylene, ethylene-propylene copolymer, low density polyethylene, polymers of vinyl-substituted aromatic compounds, hydrogenated polybutadiene of branched structure, hydrogenated polyisoprene, hydrogenated copolymers of conjugated diene and vinyl-substituted aromatic compounds and the like. It will be evident to those skilled in the art that the foregoing polymers contain hydrogen atoms that are attached to tertiary carbon atoms within the polymer molecule. We have found that when the hydrogenated polymers of conjugated dienes are used in the process of our invention, it is desirable that the polymer contain not more than 20 carbon-carbon double bonds per 1000 carbon atoms in the polymer molecule.

The tertiary alkyl halides that are employed in the halogenation reaction of our invention can be represented by the formula

wherein R, R', and R" are alkyl groups containing from 1 to 3 carbon atoms and X is either chlorine or bromine. Chlorine is preferred for reasons of economy. Illustrative of the tertiary alkyl halides that can be used in the process of our invention are tertiary butyl chloride, tertiary butyl bromide, 2 - methyl - 2 - chlorobutane, 2-methyl-2-bromopentane, 3-methyl-3-chloropentane, 3-ethyl-3-chloropentane, 4-n-propyl-4-bromoheptane, 4-ethyl-4-chloroheptane, 4-ethyl-4-bromoheptane, and the like.

The aluminum halides that can be used in the process of our invention are either aluminum chlorides or aluminum bromides. Again, the chlorides are preferred because of economic reasons. The aluminum halides will be selected from the group consisting of aluminum chloride, aluminum bromide, alkylaluminum dichlorides, alkylaluminum dibromides, dialkylaluminum chlorides, dialkylaluminum bromides, alkylaluminum sesquichlorides, and alkylaluminum sesquibromides and other mixtures of the above compounds. The alkyl groups present in the alkylaluminum halides will contain from 1 to 3 carbon atoms. Examples of suitable organoaluminum halides that can be used are methylaluminum dichloride, methylaluminum dibromide, ethylaluminum dibromide, propylaluminum dichloride, dimethylaluminum chloride, diethylaluminum bromide, di-n-propylaluminum chloride, methylethylaluminum chloride, and mixtures of two or more of these compounds, such as ethylaluminum sesquichloride, methylaluminum sesquibromide, and the like.

The polymers that are to be halogenated according to our invention can be produced by any method known in the prior art. We have found it to be desirable to dissolve or disperse the polymer in the tertiary alkyl halide and conduct the halogenation utilizing the tertiary alkyl halide as the reaction medium. After the polymer has been dissolved or dispersed in the tertiary alkyl halide, the aluminum halide is introduced and the mixture is agitated. If desired, however, a diluent that is inert under the halogenation reaction conditions can be employed for the halogenation reaction. Examples of suitable diluents are n-butane, n-pentane, n-hexane, n-decane, cyclopentane, cyclohexane, and the like.

The temperatures for the halogenation reaction is generally in the range of about 0 to 160° F. Preferably the temperature will be in the range of about 35 to 100° F. The reaction time is generally in the range of about 30 seconds to about 30 minutes. In most instances the desired halogenation can be completed in from about 1½ minutes to about 15 minutes. The relatively short reaction times, i.e., 15 minutes or less, generally give higher molecular weight products. Halogenated polymers with molecular weights corresponding to the molecular weight of the starting polymer can be obtained by controlling the temperature and time of the reaction. Lower molecular weight products are obtained as the reaction time is extended. Regardless of the molecular weight of the final halogenated polymer product, the halogenation treatment results in the formation of a product with an average of one halogen atom per polymer molecule. While the exact mechanism of the reaction is not fully understood, it is believed that as the polymer remains in contact with the alkyl halide and the aluminum halide, the halogenation process continues and the polymer undergoes degradation, thereby reducing the molecular weight of the polymer molecules.

The mole ratio of the tertiary alkyl halide to the aluminum halide used for the halogenation treatment is in the range of about 0.7:1 to 35:1. The amount of aluminum halide expressed in terms of polymer being treated is in the range of about 0.03 to 0.35 gram moles per 100 grams of polymer.

At the conclusion of the halogenation reaction, the mixture of polymer, tertiary alkyl halide and aluminum halide is treated to inactivate the reactants. We have found that it is convenient to inactivate the reactants by adding water, a dilute acid, dilute alcohol solutions, and the like. This results in hydrolyzing the reactants.

The polymer produced by the above-described halogenation process contains an average of one halogen atom per polymer molecule. This halogenated polymer can further be reacted with a lithium terminated polymer to produce a block copolymer. The reaction proceeds by the reaction of the lithium and the halogen atom to form lithium halide thereby coupling the two separate polymer molecules.

The lithium terminated polymers that are utilized in the present process are well known in the prior art. Suitable lithium terminated polymers can contain from 1 to 4 lithium atoms per polymer molecule. They can be conveniently prepared by the methods set forth in U.S. Patents 2,975,160; 3,030,346; and 3,078,254. The polymers utilized for reaction with the halogenated polymers described above can be homopolymers of the conjugated diene containing from 4 to 12 carbon atoms per molecule, copolymers of these conjugated dienes with vinyl-substituted aromatic compounds, and the like. We have found that it is desirable to use the unquenched polymerization mixture of the lithium terminated polymer for reaction with the halogenated polymer to produce the block copolymers of this invention. Therefore, the invention can be conveniently carried out by polymerizing the conjugated diene or other monomer or mixture of monomers with the organolithium initiator in a suitable diluent and thereafter reacting the polymerization reaction mixture, without any treatment for inactivating the lithium initiator, with the halogenated polymer prepared by the procedure set forth above.

For most purposes substantially stoichiometric amounts of the halogenated polymer and the lithium terminated polymer are used when preparing the block copolymers. Therefore, sufficient halogenated polymer will be combined with the lithium terminated polymer so as to provide equimolar quantities of the halogen and lithium in the two polymers. If desired, however, one of the polymers can be present in excess. When one of the polymers is present in excess, the resulting polymer product will consist of a mixture of the block copolymer and the unreacted polymer present in excess. Generally, the excess of either polymer will be less than about 3:1, when calculated on the basis of halogen and lithium present. Simple block copolymers are produced when a halogenated polymer, containing one halogen atom per molecule, is reacted with a monolithium polymer. When the lithium terminated polymer contains a lithium atom at each end of the polymer chain, the copolymer product contains a central block of this polymer with terminal polymer blocks from the halogenated polymer.

The temperature for reacting the halogenated polymer with the lithium terminated polymer can vary over a wide range. In general, a suitable temperature is in the range of about 20° to 250° F. Preferably, the temperature will be in the range of about 60° to 175° F. The time for reaction will be governed to some extent by the temperature. In general it will be in the range of about 15 minutes to 100 hours or longer.

A wide variety of products ranging from plastics to rubbers can be produced depending upon the nature of the two types of polymers that are reacted. Conjugated diene polymers having improved processability and excellent vulcanizate properties can be produced by reacting the lithium terminated conjugated diene polymer with a monochlorinated atactic polypropylene.

This invention provides a method for producing polymer products wherein a substituent which is unsaturated replaces one of the hydrogen atoms of the original saturated polymer. The unsaturated substituents in such polymers as low density polyethylene, ethylene-propylene copolymers, and the like, render them sulfur vulcanizable. For example, it is possible to halogenate a copolymer of ethylene and propylene and thereafter react it with a lithium terminated polymer of butadiene to produce a final block copolymer that can be vulcanized in a conventional sulfur vulcanization system.

Various modifications and changes may be made in the procedure set forth above without departing from the spirit and scope of our invention.

The following example illustrates one embodiment of our invention. The example is included for illustrative purposes and is not to be interpreted as unduly limiting the scope of our invention.

EXAMPLE I

Atactic polypropylene (semisolid polymer of molecular weight 2285, inherent viscosity 0.14, and zero gel) was chlorinated with a mixture of tert-butyl chloride and aluminum chloride. In each of four runs the following amounts of materials were used:

| | |
|---|---|
| Polypropylene, grams | 25 |
| Tert-butyl chloride, ml. | 125 |
| Aluminum chloride, grams | 8 |

In each run the polypropylene was dispersed in the tert-butyl chloride to give an essentially homogeneous mixture. Aluminum chloride was introduced, with agitation, in four portions. Addition of the aluminum chloride was complete in 2–3 minutes. The reaction was accompanied by evolution of gas. The total reaction time was 15 minutes and the temperature was 75° F. The mixture was hydrolyzed with 100 milliliters of 20 weight percent aqueous acetic acid. The organic and aqueous layers were separated and the organic layer was washed once with 20 percent acetic acid and twice with water. It was then poured into isopropyl alcohol to coagulate the polymer. The product was separated and dried. The combined weight of product from the four runs was 60.4 grams. It was a semisolid material which had a molecular weight of 2280 and contained 1.5 weight percent chlorine, or an average of one atom of chlorine per molecule of polymer. This product is hereinafter designated as polymer A.

The alcohol that was separated from the coagulated polymer was evaporated and 23.7 grams of an oily product was recovered. It had a molecular weight of 397 and contained 8.2 weight percent of chlorine, or an average of one atom of chlorine per molecule of polymer.

Butadiene was polymerized in the presence of n-butyllithium and the unquenched reaction mixture (polymer-lithium) was then reacted with chlorinated polypropylene, previously designated as "polymer A" to give a block copolymer. The following polymerization recipe was used:

| | |
|---|---|
| 1,3-butadiene, parts by weight | 100 |
| Cyclohexane, parts by weight | 780 |
| n-Butyllithium, mhm.[1] | 0.84 |
| Temperature, ° F. | 122 |
| Time, hours | 3 |

[1] mhm.=gram millimoles per 100 grams monomer.

Cyclohexane was charged to the reactor and it was then purged with nitrogen. Butadiene was added and then the butyllithium. After a three-hour polymerization period (quantitative conversion of the butadiene) 1.5 gram millimoles per 100 grams of the butadiene charged of the chlorinated polypropylene was added and the reaction was continued another 21 hours. The temperature was maintained at 122° F. and the reactor contents were agitated. A solution of 2,2'-methylene-bis(4-methyl-6-tert-butylphenol) in isopropyl alcohol was added to the reaction mixture, the amount used being sufficient to provide one part by weight of the antioxidant per 100 parts by weight of the block copolymer. The copolymer was then coagulated in isopropyl alcohol, separated and dried. This run is hereinafter designated as "1."

Two control runs were made without chlorinated polypropylene. The butyllithium level in the first run was 0.84 mhm. (designated as run "2") and in the second run it was adjusted to 0.60 mhm. to give a product of similar Mooney value (ML–4 at 212° F.) to that of the block copolymer (designated as run "3"). Polymerization time in each case was 24 hours to correspond with the reaction time for preparing the block copolymer.

In each case five identical runs were made and the polymers were blended. Raw Mooney values, cold flow, and inherent viscosity were determined on each of the products. Each polymer product was then compounded using the following recipe:

| | Parts by wt. |
|---|---|
| Polymer | 100 |
| High abrasion furnace black | 50 |
| Zinc oxide | 3 |
| Stearic acid | 2 |
| Flexamine [1] | 1 |
| Aromatic oil | 10 |
| Sulfur | 1.75 |
| Santocure [2] | 1.1 |

[1] Physical mixture containing 65 percent of a complex diarylamine-ketone reaction product and 35 percent of NN'-diphenyl-p-phenylenediamine.
[2] N-cyclohexyl-2-benzothiazolesulfenamide.

Processing properties and physical properties of the vulcanizates were determined. Data are presented in Table I.

TABLE I

| | 1 | 2 | 3 |
|---|---|---|---|
| Raw polymer properties: | | | |
| ML–4 at 212° F.[1] | 40 | 14 | 38 |
| Cold flow, mg./min.[2] | 5.89 | 25.11 | 14.71 |
| Inherent viscosity [3] | 2.18 | 1.90 | 2.23 |
| Gel., wt. percent [3] | 0 | 0 | 0 |
| Processing properties: | | | |
| Compd. ML–4 at 212° F.[1] | 78 | 44 | 88 |
| Extrusion at 250° F.:[4] | | | |
| Inches/min | 54 | 75 | 46 |
| Grams/min | 112 | 103 | 76 |
| Rating (Garvey die) | 7+ | 11+ | 7+ |
| Vulcanizate properties, cured 30 minutes at 307° F.: | | | |
| $\nu \times 10^4$, Moles/cc [5] | 1.20 | 1.14 | 1.32 |
| 300% Modulus, p.s.i.[6] | 1,425 | 1,290 | 1,430 |
| Tensile, p.s.i.[6] | 2,660 | 2,480 | 2,570 |
| Elongation, percent [6] | 420 | 460 | 420 |
| 200° F. tensile, p.s.i.[6] | 1,275 | 840 | 920 |
| ΔT, ° F.[7] | 49.7 | 61.2 | 50.2 |
| Resilience, percent [8] | 76.1 | 71.6 | 75.5 |
| Shore A Hardness [9] | 61.5 | 62 | 63.5 |

[1] ASTM D-1646-63.
[2] Cold flow was determined by extruding the polymer through a ¼ orifice at 3.5 p.s.i. pressure and at a temperature of 122° F. After allowing 10 minutes to reach steady state, the rate of extrusion was measured and reported in milligrams per minute.
[3] Determined by procedure in U.S. 3,116,273.
[4] Determined by procedure in U.S. 2,975,160.
[5] Determined by procedure in Rubber World 135, 67-73, 254-260 (1956)
[6] ASTM D-412-62T.
[7] ASTM D-623-62.
[8] ASTM D-945-55.
[9] ASTM D-1706-61.

The block copolymer of run 1 exhibited a much lower cold flow than either of the controls even though the polymer in run 3 had a similar Mooney value. The block copolymer gave a faster extrusion rate with the same extrusion appearance as the polymer in run 3, thus indicating an advantage in processing properties. The vulcanizate properties were good, with the block copolymer being superior in hot tensile strength and having higher tensile strength and resilience and lower heat build-up.

Evidence for the formation of a block copolymer by reacting polymer-lithium with chlorinated polypropylene was obtained from inherent viscosity and cold flow determinations on the block copolymer, the polybutadiene used for preparing the block copolymer, and on physical blends of polybutadiene with the chlorinated polypropylene. The block copolymer of run 1 had a higher inherent viscosity and much lower cold flow than the polybutadiene prepared in control run 2 (same butyllithium level used for preparing polybutadiene in runs 1 and 2). The inherent viscosity of physical blends of polybutadiene with chlorinated polypropylene was essentially that of the polybutadiene and there was no reduction in cold flow.

We claim:

1. A process for halogenating a hydrocarbon polymer having at least one hydrogen atom attached to a tertiary carbon atom per molecule and that has from 0.5 to 20 carbon-carbon double bonds per 1000 carbon atoms selected from polymers of atactic propylene, ethylene-propylene copolymer, low-density polyethylene, polymers of vinyl-substituted aromatic compounds, hydrogenated polybutadiene of branched structure, hydrogenated polyisoprene, or hydrogenated copolymers of conjugated diene and vinyl-substituted aromatic compounds comprising: contacting said polymer with (1) a tertiary alkyl halide having the formula

wherein R, R' and R" are alkyl groups having from 1 to 3 carbon atoms each and X is chlorine or bromine; and (2) an aluminum halide selected from the group consisting of aluminum chloride, aluminum bromide, alkylaluminum dichloride, alkylaluminum dibromide, dialkylaluminum chloride, dialkylaluminum bromide, alkylaluminum sesquichloride and alkylaluminum sesquibromide, wherein each of the alkyl groups has from 1 to 3 carbon atoms wherein the mol ratio of said tertiary alkyl halide to said aluminum halide is from about 0.7:1 to 35:1 and the amount of said aluminum halide is from about 0.03 to 0.35 gram moles per 100 grams of said hydrocarbon polymer; and recovering the thus halogenated polymer, said recovered halogenated polymer having an average of one halogen atom per molecule of said polymer.

2. The process of claim 1 wherein said contacting takes place at a temperature of from about 0° to 160° F. for a period of from about 30 seconds to 30 minutes.

3. The process of claim 2 wherein said hydrocarbon polymer is atactic polypropylene.

4. The process of claim 3 wherein said tertiary alkyl halide is tert-butyl chloride and said aluminum halide is aluminum chloride.

5. The process of claim 1 wherein the thus halogenated polymer is reacted with a lithium terminated polymer to form a block copolymer, wherein said lithium terminated polymer is a homopolymer of a conjugated diene containing from 4 to 12 carbon atoms or a copolymer of said conjugated dienes and vinyl substituted aromatic compounds said lithium terminated polymer containing from 1 to 4 lithium atoms per polymer molecule.

6. The process of claim 5 wherein said halogenated polymer is reacted with a lithium terminated polymer at a temperature of from about 20° to 250° F.

7. The process of claim 6 wherein said lithium terminated polymer is a polymer of 1,3-butadiene.

8. The process of claim 3 wherein said thus halogenated polymer is reacted with a lithium terminated polymer to form a block copolymer, wherein said lithium terminated polymer is a homopolymer of a conjugated diene containing from 4 to 12 carbon atoms or a copolymer of said conjugated dienes and vinyl substituted aromatic compounds, said lithium terminated polymer containing from 1 to 4 lithium atoms per polymer molecule.

9. The process of claim 8 wherein said lithium terminated polymer is a polymer of 1,3-butadiene.

References Cited

UNITED STATES PATENTS

| | | |
|---|---|---|
| 3,078,254 | 2/1963 | Zelinski et al. |
| 3,281,383 | 10/1966 | Zelinski et al. _____ 260—23.7 |
| 3,403,138 | 9/1968 | Edwards et al. |
| 2,183,556 | 12/1939 | Fawcett. |
| 2,474,827 | 7/1949 | Condon. |
| 3,135,717 | 6/1964 | Gregorian et al. _____ 260—899 |
| 3,262,899 | 7/1966 | Armour et al. _____ 260—94.9 |
| 3,342,755 | 9/1967 | Calmon et al. _____ 260—2.2 |

OTHER REFERENCES

Brewer et al.—73 Jour. Amer. Chem. Soc., 2257–2259, May 1951, copy in chem. lib.

MURRAY TILLMAN, Primary Examiner

M. J. TULLY, Assistant Examiner

U.S. Cl. X.R.

260—85.1, 88.2, 93.5, 94.7, 94.9, 96, 878, 880, 890, 892, 894